Sept. 22, 1953     N. R. KRAUSE ET AL     2,652,677
HARVESTER-THRESHER FRAME STRUCTURE
Original Filed April 7, 1942     12 Sheets-Sheet 1
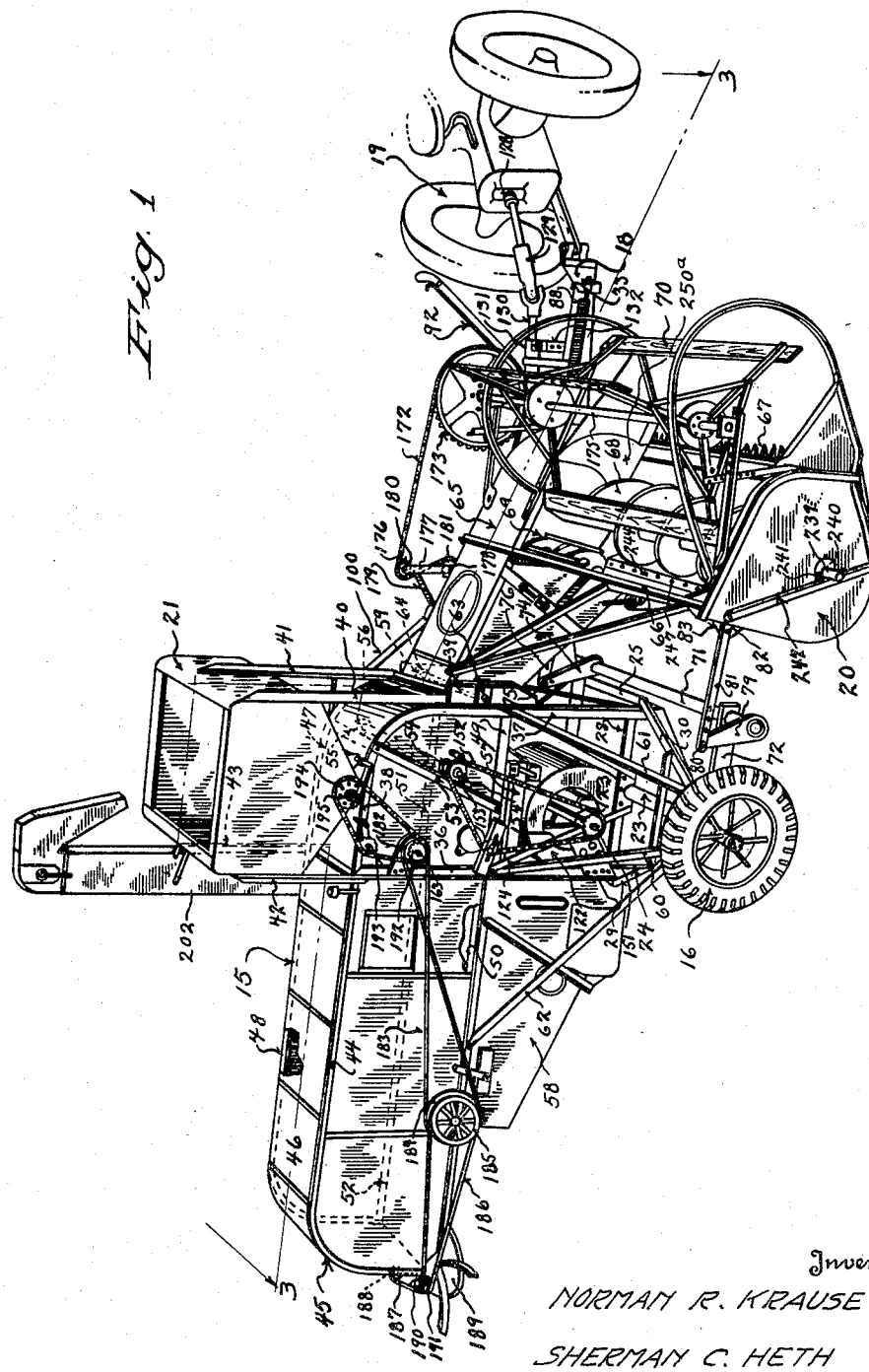
Inventors
NORMAN R. KRAUSE
SHERMAN C. HETH
By Emerson B Donnell
Attorney

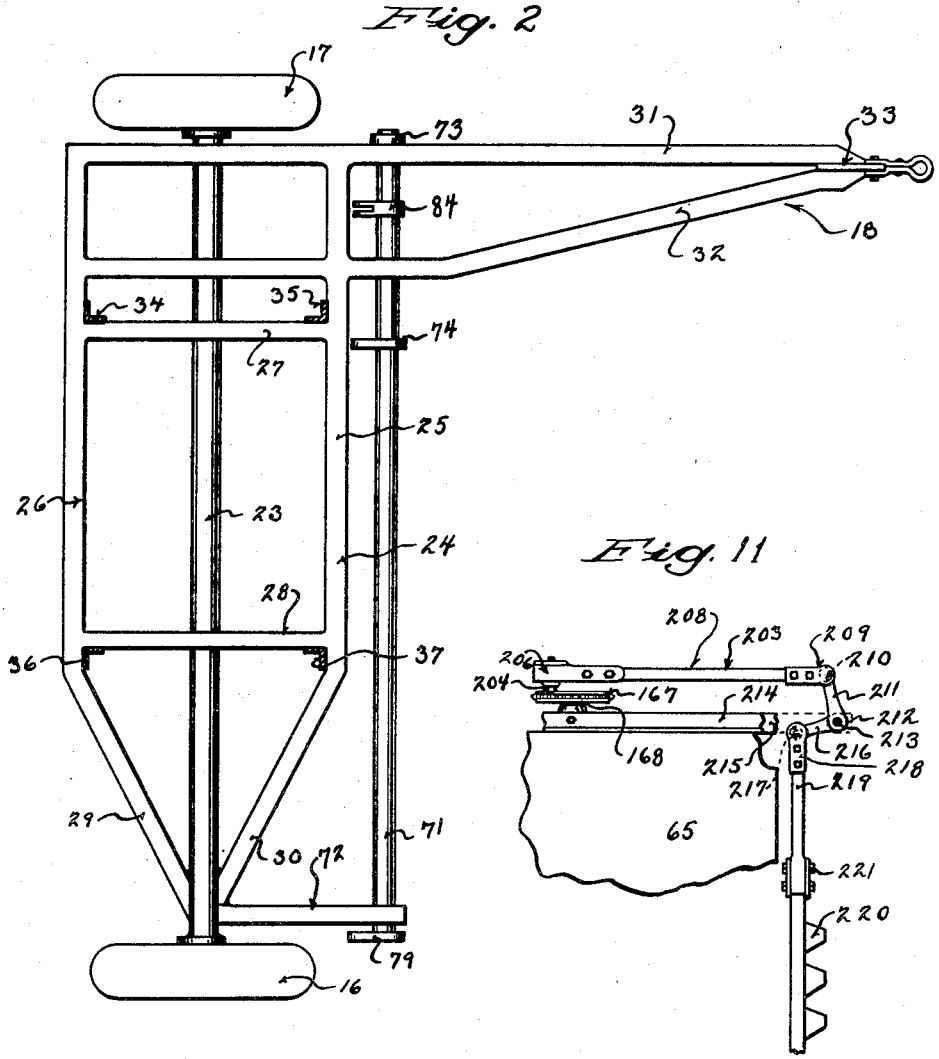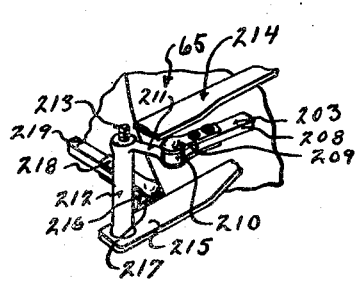

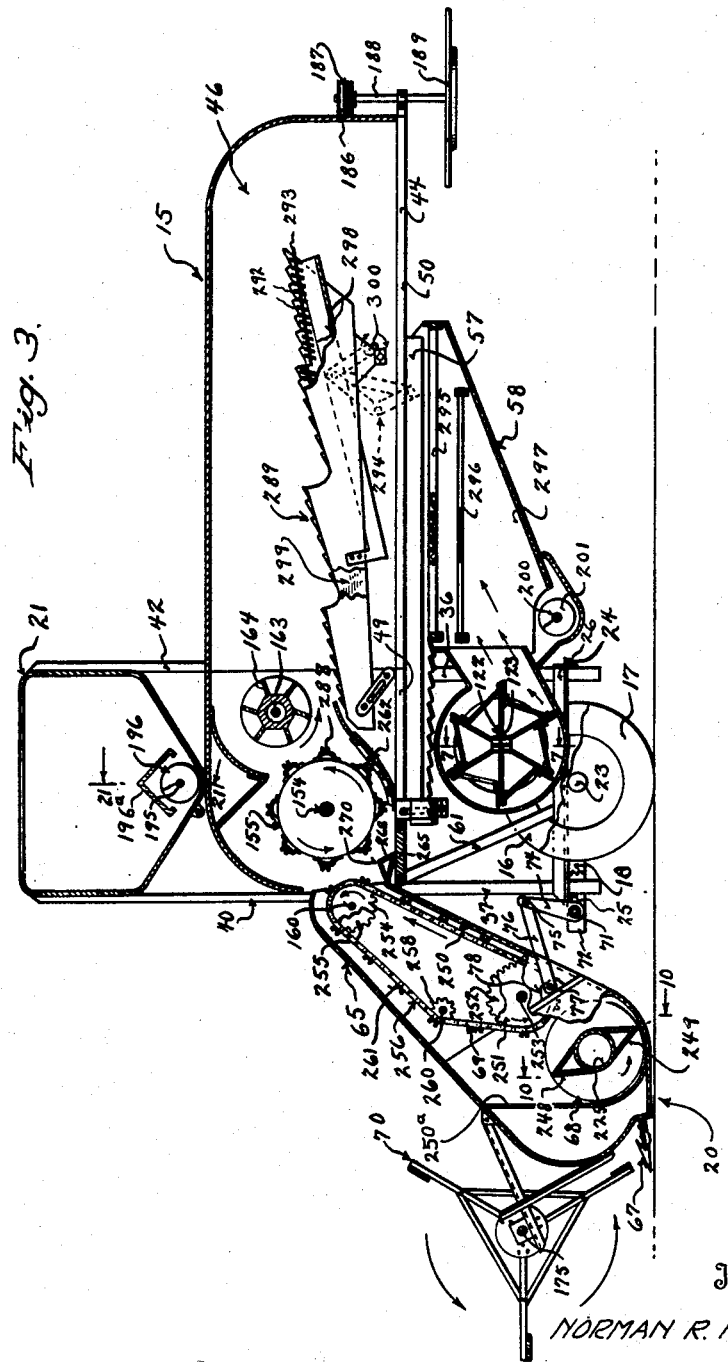

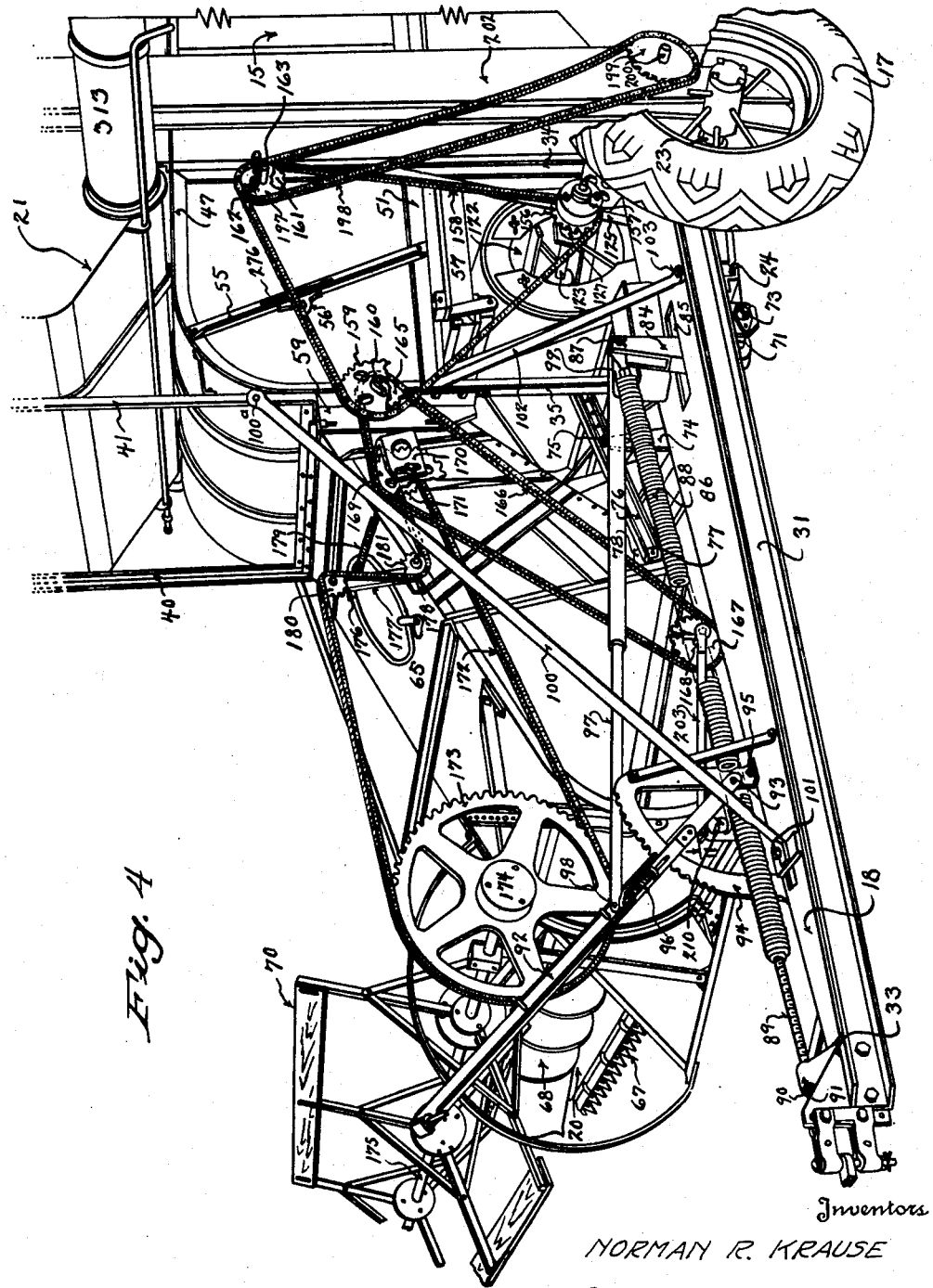

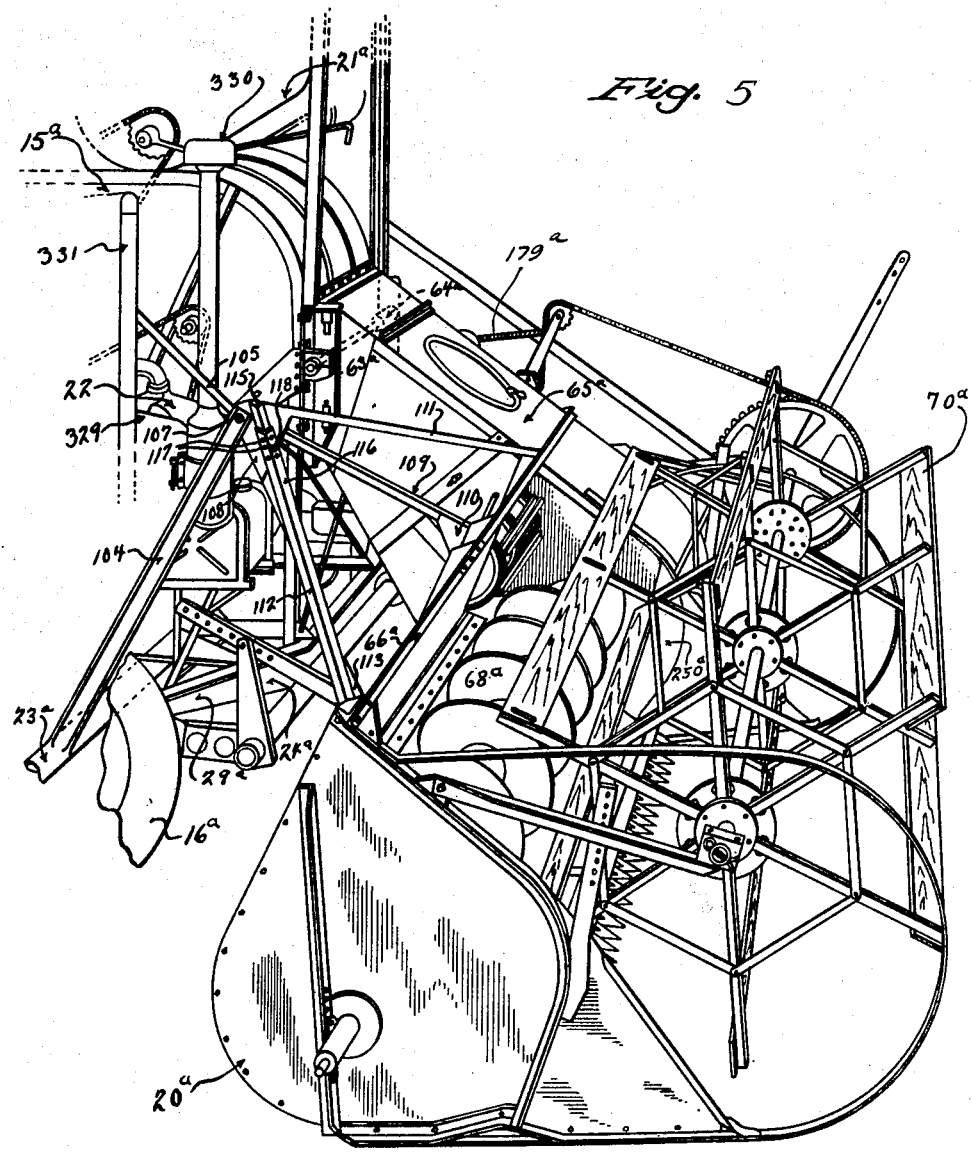

Sept. 22, 1953  N. R. KRAUSE ET AL  2,652,677
HARVESTER-THRESHER FRAME STRUCTURE
Original Filed April 7, 1942  12 Sheets-Sheet 6

Inventors
NORMAN R. KRAUSE
SHERMAN C. HETH
By Emerson B Donnell
Attorney

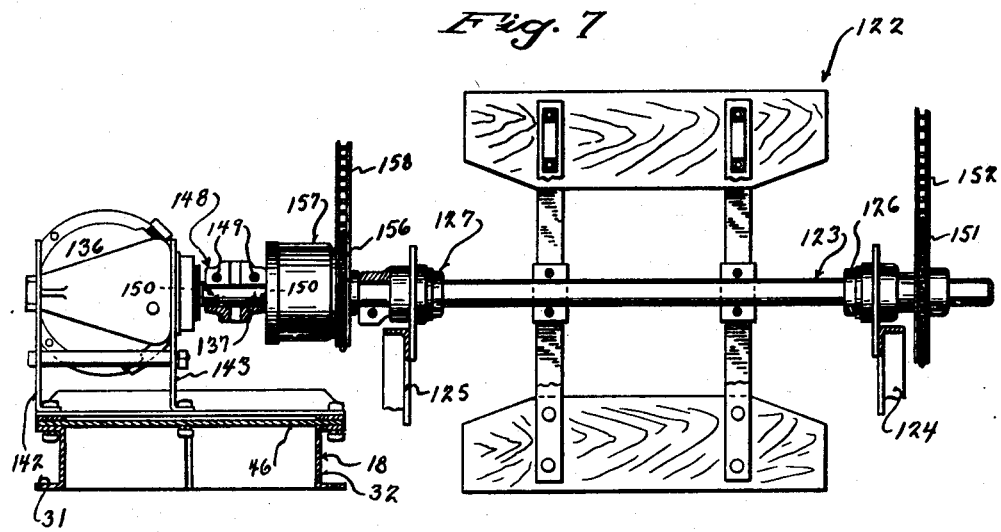
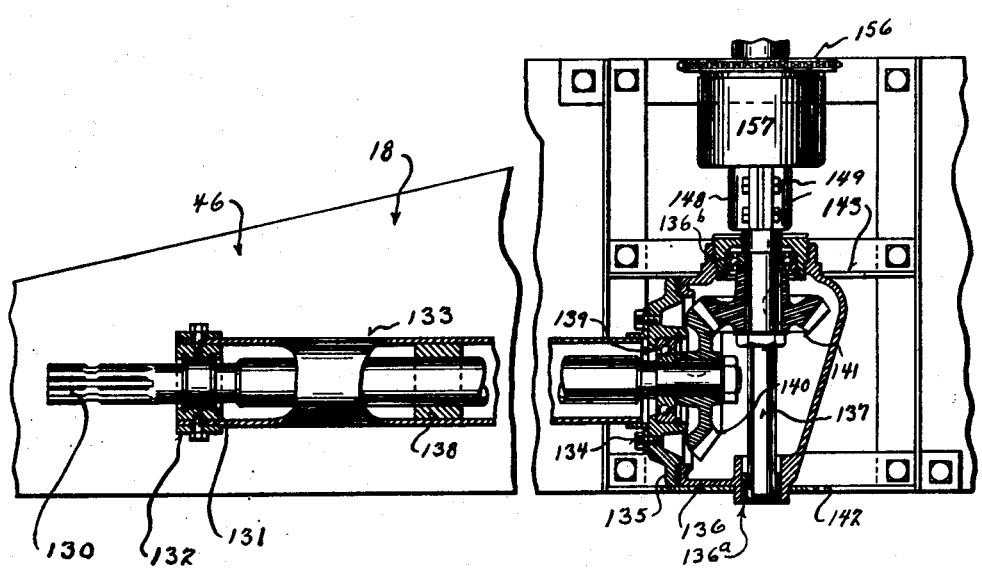

Sept. 22, 1953     N. R. KRAUSE ET AL     2,652,677
HARVESTER-THRESHER FRAME STRUCTURE
Original Filed April 7, 1942     12 Sheets-Sheet 8
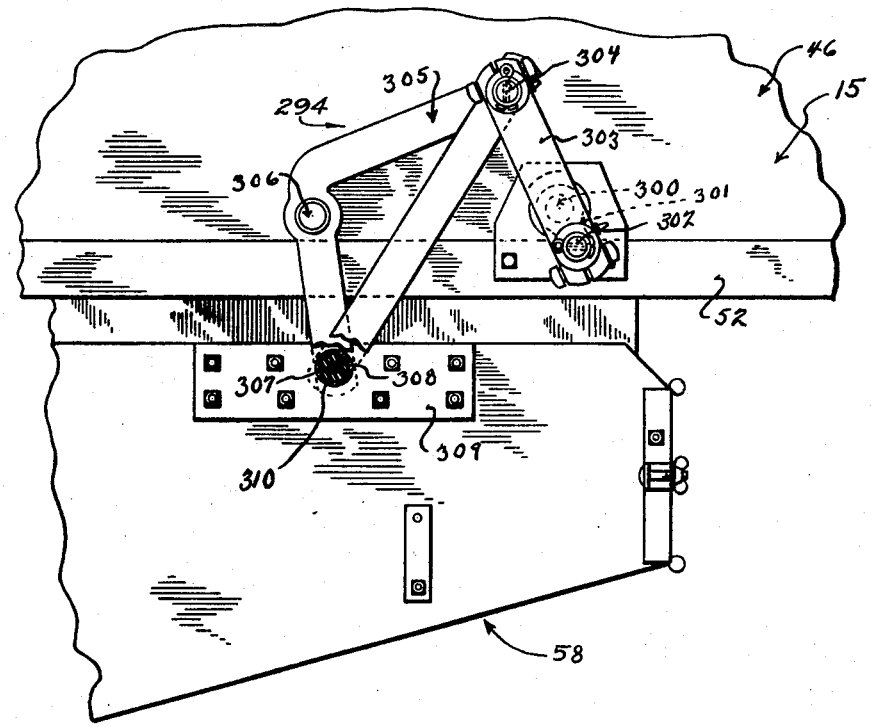
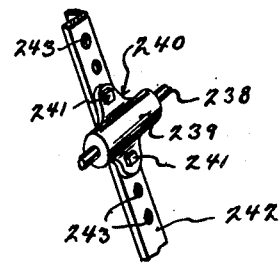
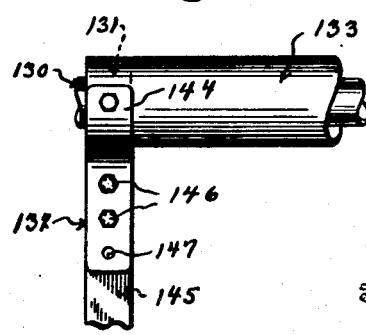
Inventors
NORMAN R. KRAUSE
SHERMAN C. HETH
By Emerson B Donnell
Attorney Sept. 22, 1953 N. R. KRAUSE ET AL 2,652,677
HARVESTER-THRESHER FRAME STRUCTURE
Original Filed April 7, 1942 12 Sheets-Sheet 9
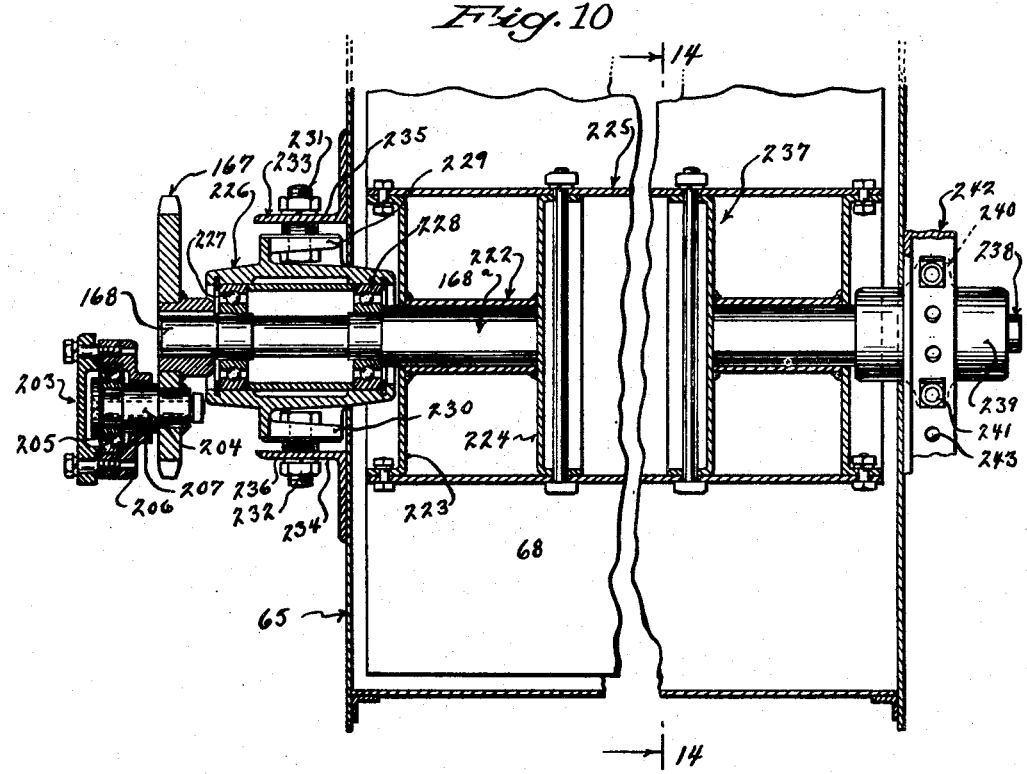
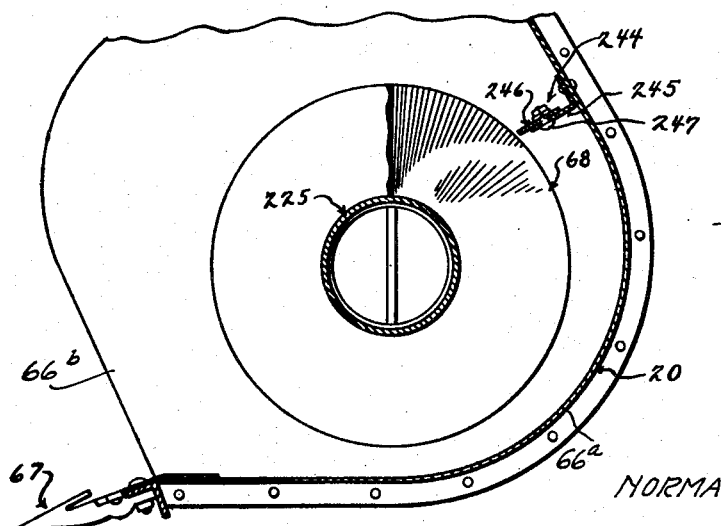
Inventors
NORMAN R. KRAUSE
SHERMAN C. HETH.
By Emerson B Donnell
Attorney Sept. 22, 1953　　　N. R. KRAUSE ET AL　　　2,652,677
HARVESTER-THRESHER FRAME STRUCTURE
Original Filed April 7, 1942　　　　　　　　　　12 Sheets-Sheet 10
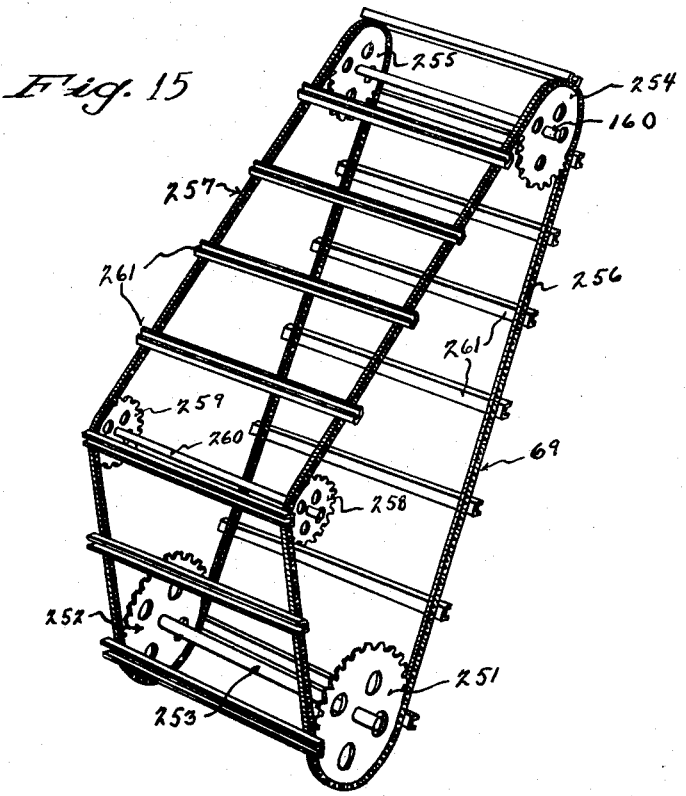
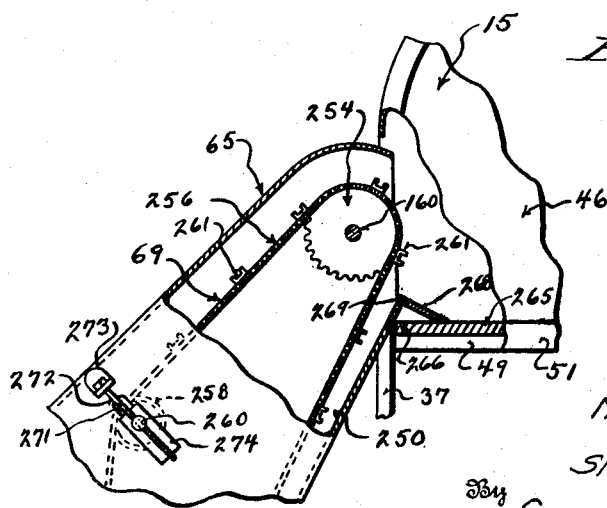
Inventors
NORMAN R. KRAUSE
SHERMAN C. HETH
By Emerson B Donnell
Attorney

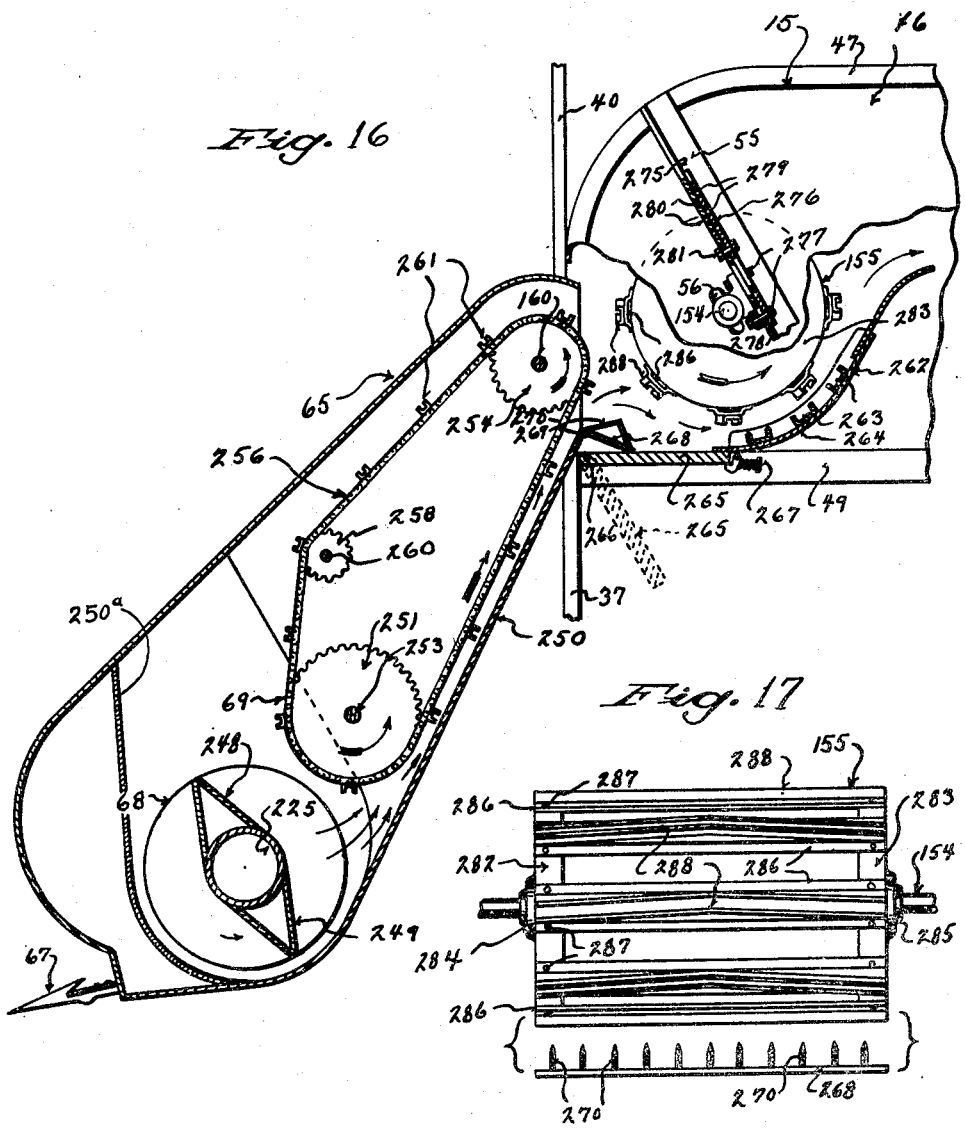

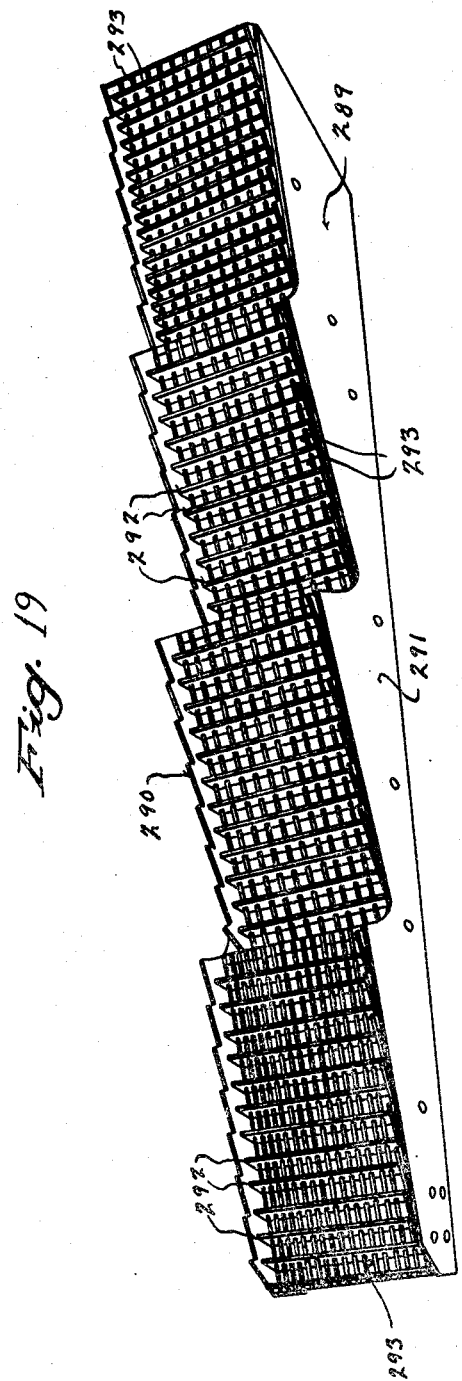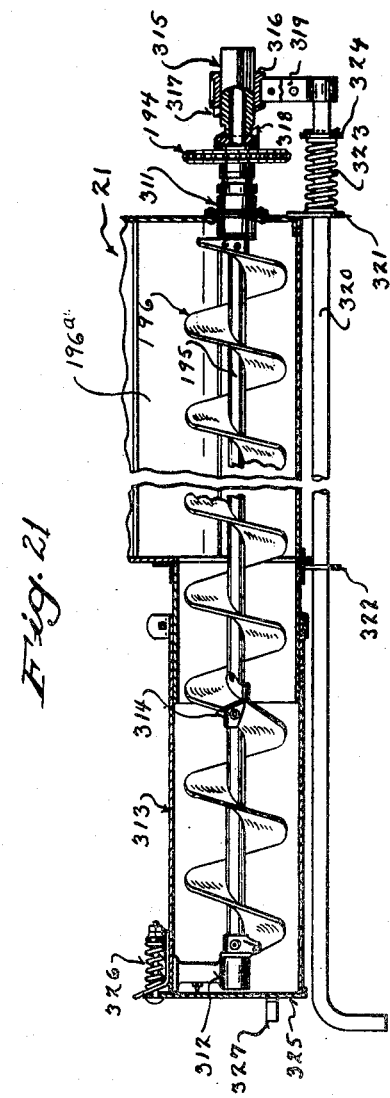

Patented Sept. 22, 1953

2,652,677

UNITED STATES PATENT OFFICE 2,652,677

HARVESTER-THRESHER FRAME STRUCTURE

Norman R. Krause and Sherman C. Heth, Racine, Wis., assignors to J. I. Case Company, Racine, Wis., a corporation of Wisconsin Continuation of application Serial No. 438,014, April 7, 1942. This application December 11, 1948, Serial No. 64,822

3 Claims. (Cl. 56—123)

The present invention relates to harvesting machines and more particularly to machines for cutting and threshing grains as a single operation, commonly known as combination harvester threshers or "combines," this application being a continuation of the application of Norman R. Krause et al., for Harvester Threshers, Serial No. 438,014, filed April 7, 1942, and now abandoned.

An object of the invention is to generally improve the construction and operation of machines of this class.

A further object is to provide a novel general structure or framing for such a machine.

Further objects are to provide an improved harvester or header construction and means for supporting it; improved feeding means for conveying grain from the header to the threshing mechanism; an improved sickle drive; improved subcombinations of the general machine structure and other expedients looking toward a realization of the above objects.

A further object is to provide a novel driving organization for such a machine resulting in extreme reliability, and economy in manufacture and maintenance.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention as herein expressed.

Figure 1 is a perspective view taken from above and to the right of an illustrative machine embodying the invention.

Fig. 2 is a plan view on a slightly larger scale than Fig. 1, of a base frame and drawbar construction, constituting part of the machine.

Fig. 3 is a fragmentary left side elevation on substantially the same scale as Fig. 1, of the machine shown in Fig. 1, with the left wall and other parts removed to show the interior, sub stantially along line 3—3 in Fig. 1.

Fig. 4 is a perspective view on a substantially enlarged scale taken from the left and front of the machine with parts removed and others broken away.

Fig. 5 is a perspective view on substantially the same scale as Fig. 4, of the front portion of a modified construction of combine, taken from the right side.

Fig. 7 is a vertical sectional view on the line 7—7 of Fig. 3 on a substantially enlarged scale.

Fig. 8 is a plan view on substantially the same scale as Fig. 7, with parts broken away and in section, of power take-off mechanism indicated in Figs. 1 and 7.

Fig. 9 is a left side elevation of a portion of Fig. 8, drawn to the same scale as Fig. 8.

Fig. 10 is a vertical sectional view on the line 10—10 of Fig. 3, greatly enlarged and with parts broken away.

Fig. 11 is a plan view of certain mechanism indicated in Figs. 4 and 10, drawn to substantially the same scale as Fig. 4.

Fig. 12 is a perspective view on a slightly enlarged scale with parts broken away of a portion of the mechanism indicated in Fig. 11.

Fig. 13 is a perspective view of certain mechanism indicated in Figs. 1 and 10, drawn to a smaller scale than Fig. 10.

Fig. 14 is a vertical sectional view on a reduced scale taken on the line 14—14 of Fig. 10.

Fig. 15 is a perspective view of a chain raddle assembly indicated in Figs. 1, 3 and 16, and drawn to a larger scale than Fig. 3.

Fig. 16 is an enlarged side elevation of a portion of the machine indicated in Fig. 3 with parts broken away to show the interior.

Fig. 17 is a front view of a threshing cylinder or element and accompanying feed plate, drawn to the same scale as Fig. 16.

Fig. 18 is a view of a portion of Fig. 16 to the same scale showing a chain tightening mechanism.

Fig. 19 is a perspective view taken from above, in front, and to the left, of a straw rack or straw walker indicated in Fig. 3, and enlarged.

Fig. 20 is an enlarged left side elevation of a portion of the machine shown in Fig. 3 with parts in section.

Fig. 21 is a vertical sectional view of an unloading auger assembly taken on the line 21—21 of Fig. 3, enlarged.

Figure 6:
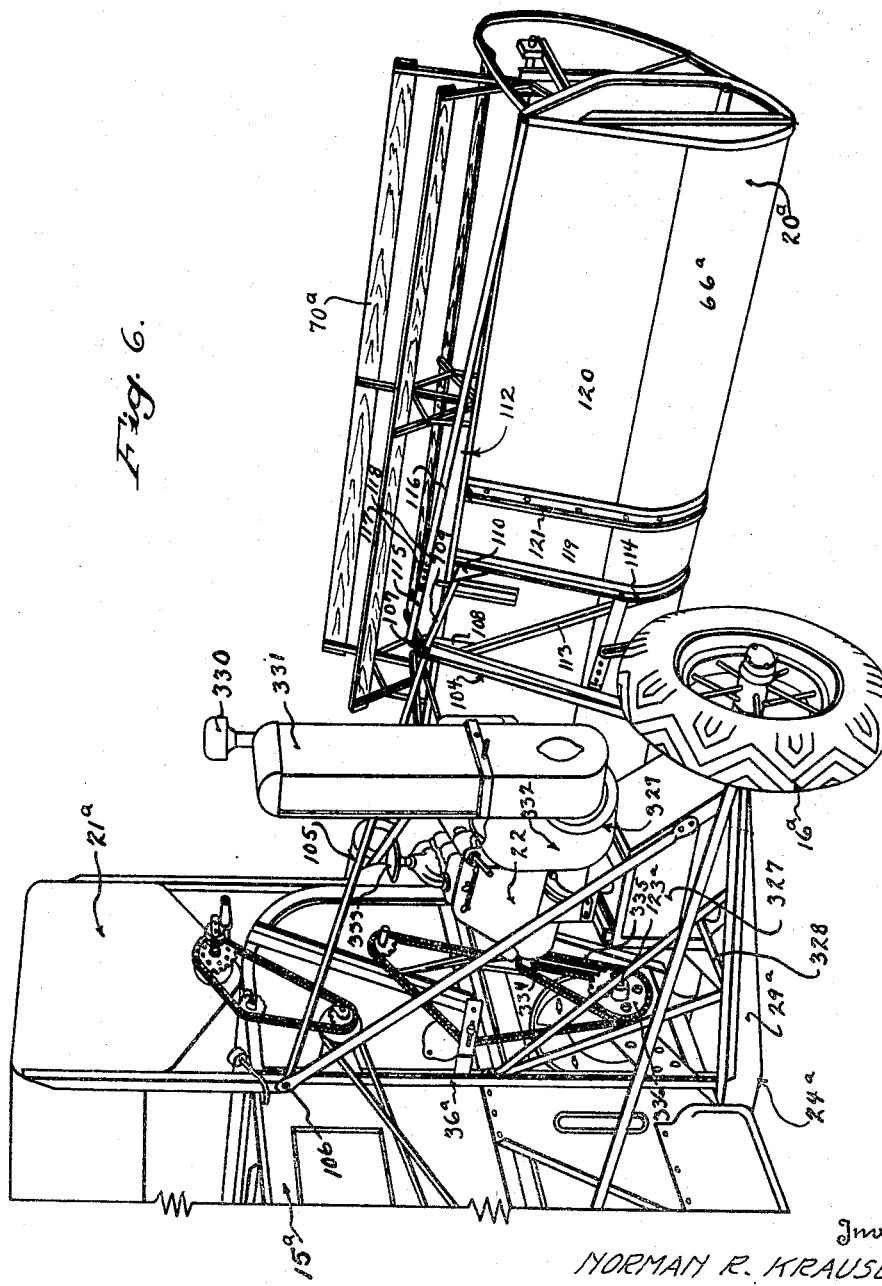
Fig. 6 is a similar view of the same machine on the same scale as Fig. 5, taken from a point further to the rear and looking forward.

As seen in Fig. 1, the machine constituting the illustrative embodiment comprises a main body portion generally designated as 15 constituting the thresher part and to which the other portions are attached and by which they are supported on wheels as 16 and 17 (Fig. 2). The machine is propelled by a draw bar 18 connected in any suitable or well-known manner with a tractor generally designated as 19 of any suitable or well-known construction. Body portion 15 also carries a harvester portion header or auger though generally designated as 20 supported from body portion 15 as will appear and a grain bin generally designated as 21 for receiving a crop as it is harvested. An engine 22, Fig. 6, may be carried by the machine for actuating the mechanism thereof while under certain conditions engine 22 may be dispensed with as will appear and the mechanism may be operated from a power source on the tractor.

While a specific embodiment of the machine has been shown and described in specific terms, it is to be understood that sprockets and chains, for example, might be replaced by pulleys and belts, or other equivalent expedients within the contemplation of the invention, and the use of the terms sprockets and chains or any other specific terms in this description, is not intended to limit the invention to such specific construction or in any manner.

An important point of novelty in the present invention is the general framing or structure of the combine. The whole machine in the present illustrative embodiment is balanced or substantially balanced over an axle 23 carried by above mentioned wheels 16 and 17. Axle 23 has a base element generally designated as 24 fixed therewith and comprising front and rear members 25 and 26, Fig. 2, and longitudinal members 27 and 28 forming a roughly rectangular frame. Converging end portions 29 and 30 form a triangle with longitudinal member 28 and are united with axle 23 adjacent wheel 16. Front and rear members 25 and 26 are intersected by forwardly extending members 31 and 32, also carried by axle 23 and united to each other at 33 to form above mentioned draw bar 18. In this manner draw bar 18 is very strongly and rigidly united with base member 24 and accordingly with the rest of the combine.

Extending upwardly from base member 24 in the present instance are four uprights, columns, or struts, 34, 35, 36, and 37, base member 24 and uprights 34, 35, 36 and 37 together forming a very stable upstanding frame-work from which the major elements of the combine may be conveniently supported.

As seen in Fig. 1, member 37 extends upwardly for some distance and then bends to the rear so as to have a substantially horizontal portion 38 which extends rearwardly and joins abovementioned upright 36. Upright 37 also carries a harvester pivot plate or support 39 upon which rests an upright 40 extending upwardly to carry above-mentioned grain bin 21. In effect, therefore, upright 37 and upright 40 may be considered as a continuous element or column extending from base member 24 all the way to grain bin 21 for carrying the very considerable weight of the load of grain directly from base member 24. In similar manner an upright 41 is joined to above mentioned upright 35. Upright 36 has an upright 42 fixed thereto in any suitable manner and extending also to grain bin 21. Uprights 36 and 42 may therefore be considered as a unitary column or support extending continuously from base member 24 to grain bin 21 and in similar manner above mentioned upright 34 has an upright 43 fixed therewith and extended to grain bin 21. It will thus be evident that in effect grain bin 21 is carried from four columns extending entirely through the main body portion 15 and supported directly upon base member 24 which is firmly anchored to axle 23 and steadied by draw bar 18. Grain bin 21 is thus substantially supported, rigidly braced and prevented from seriously racking the thresher structure, and this with a minimum of material and weight for the reason that the major portion of uprights 34, 35, 36 and 37 is already in the machine for other purposes. Base 24 and uprights 37, 40; 35, 41; 36, 42 etc. thus constitute a central substantially vertical wheel supported stress bearing structure from which the major parts of the combine are supported, as will appear.

Body portion 15 comprises for the most part the threshing and separating portion of the combine which is located generally to the rear of the frame-work defined by base portion 24 and uprights 34, 35, 36 and 37. Thus a frame member 44 extends rearwardly substantially in line with above mentioned horizontal portion 38 and bends downwardly at 45 to follow the desired contour of separator housing 46. Upright 35 has a portion 47 extending rearwardly and joining with upright 34 in a manner similar to that described in connection with portion 38 and upright 36. A member 48 extends rearwardly from portion 47 in a manner similar to above mentioned portion 44, defining the opposite side of separator housing 46.

A frame member 49 extends substantially horizontally between uprights 36 and 37 substantially at the desired level of the bottom of separator housing 46 and a member 50 extends rearwardly from member 49 to define the lower margin of separator housing 46. In similar manner a member 51 extends between above mentioned uprights 35 and 34 and a member 52 extends rearwardly from member 51. These members therefore define a rearwardly projecting, overhanging, or cantilever separator housing.

In the present instance an upwardly extending diagonal member 53 is carried by member 49 and portion 38, and serves as a support for a cylinder bearing generally designated as 54. In similar manner a member 55 extends between member 51 and portion 47 and serves as a support for a cylinder bearing 56.

As will be understood, the usual grain pan 57 and cleaning shoe 58 are carried by above mentioned members 49, 50, 51 and 52 as is separator housing 46. A harvester pivot plate or support 59 similar to above mentioned support 39 is carried by upright 35 and from which header portion 20 is suspended as will appear. It will thus be apparent that in general the major parts of the machine are carried from above mentioned uprights 34, 35, 36 and 37 and base portion 24, although it will be understood that certain minor parts of the machine may be carried in other ways for convenience and also that a limited amount of extraneous bracing may be advisable and used within the contemplation of the invention. For example, braces 60 and 61 in the present instance extend upwardly from the junction of portions 29 and 30 with axle 23 to the points of attachment of portion 49 with uprights 36 and 37 respectively. These braces together with portions 29 and 30, as will be apparent, define a series of triangles so disposed as to resist any tendency toward relative twisting movement between grain bin 21 and base portion 24, thus furnishing a substantially torsionally rigid frame unit for the attachment of the several parts.

A brace 62 is also preferably provided between member 50 and the point of attachment of braces 60 and 61 to axle 23 and which serves to prevent weaving of the rear end of separator housing 46.

The support for header 20 is as follows. Pivot bearings 63 and 64 are carried respectively by plates 39 and 59, as above set forth, and pivotally support a feeder house 65 generally rectangular in cross-section and preferably, although not necessarily, of gradually increasing depth forwardly of bearings 63 and 64. Feeder house 65 extends forwardly and downwardly, and in the present instance is rigidly connected with an auger trough or cross conveyor housing 66. Housing 66 extends laterally, in the present instance to the right of housing 65, referring to the normal direction of progress of the machine, the two comprising a substantially rigid harvester unit extending forwardly of the central portion constituted by uprights 34 to 37 and substantially balancing the rearwardly overhanging portion 45 of separator housing portion 15. Cross conveyor housing 66 in the present instance comprises a trough-like element 66a, Fig. 14, open at the front 66b of the combine and having a cutter bar generally designated as 67 carried by the lower forward edge thereof and within which rotates an auger conveyor generally designated as 68. Suitable conveying means generally designated as 69, Fig. 2, is disposed within feeder house 65 and a reel generally designated as 70 is carried by trough portion 66, all as will be described in detail presently. The structure thus far described would normally pivot downwardly about pivot bearings 63 and 64 so that the forward portion in the neighborhood of cutter bar 67 would rest upon the ground. Furthermore, the counterbalancing effect on separator housing portion 15 of the weight of harvester portion 20 would be lost. In the present instance the weight of harvester 20 is transmitted back to the framing through the counterbalancing mechanism, as will now be described.

A torque tube or element 71 is journaled at or near one end in a bracket or strut 72 extending forwardly from axle 23 and at the other end in a suitable bearing 73, Fig. 4, supported in the present instance on member 31 of draw bar 18. Torque tube 71 has an upwardly extending arm 74 pivoted at 75 to link 76 pivoted at 77 to a bearing or bracket 78 suitably fixed with a portion of feeder house 65. In similar manner an arm 79, Fig. 1, extends upwardly from torque tube 71 in the neighborhood of bracket 72 and is pivotally connected at 80 with a link 81 pivotally connected at 82 with a bracket or bearing 83 fixed with auger trough 66. It will now be apparent that clockwise rotation of torque tube 71, as seen in Fig. 1, will push forwardly through links 76 and 81 and cause upward rotation of harvester 20 about pivot bearings 63 and 64. It will also be apparent that the reaction of the weight of harvester 20 will be exerted backwardly against links 81 and 76 and forwardly against bearings 63 and 64, thereby tending to rotate the whole combine structure, about axle 23 as a pivot, in a clockwise direction, thus tending to counterbalance the tendency of separator portion 15 to cause similar rotation in a counterclockwise direction.

Torque tube 71 as more particularly seen in Fig. 2, has an arm 84 thereon extending upwardly through an opening 85, Fig. 4, in a deck portion 86 of draw bar 18, arm 84 being pivotally connected at 87 with a counterbalancing spring 88 of any suitable or well-known type having a tension member 89 such for example as a threaded rod anchored in a bracket 90 by a nut 91, tension in spring 88 being readily adjustable by manipulation of nut 91 as will be apparent. In this manner, a continuous turning effort is exerted on torque tube 71 in the proper direction to tend to support harvester portion 20.

Torque tube 71 and its attached parts form a convenient means for adjusting the height of harvester 20, in the present instance a lever 92 being pivoted at 93 to a quadrant 94 suitably fixed at 95 to draw bar 18. Lever 92 is provided with latch mechanism 96 of well-known form for fixing it in desired position on quadrant 94 and a link 97 is pivoted at 98 to lever 92 and connected as by a slot 99 in the present instance to above mentioned pivot 87 on arm 84. In practice, spring 88 is adjusted to counterbalance the major portion of the weight of harvester 20 so that the harvester will tend to rest lightly on the ground with lever 92 in its extreme upward position. Downward movement of lever 92, by pulling through link 97, will cause counterclockwise rotation of torque tube 71 as seen in Fig. 4, and raising of harvester 20. In the event that the harvester encounters an obstruction it may rise independently of any movement of lever 92 with consequent forward movement of arm 84, moving forward freely in slot 99.

As particularly apparent in Fig. 4, additional braces to supplement the general structure heretofore described are provided. Thus a brace 100 extends from a fastening 100a on upright 41 forwardly and downwardly to an anchorage 101 on draw bar 18, thus avoiding extreme torsional stresses in the juncture of draw bar 18 with base 24. A brace 102 extends from horizontal frame portion 51 outwardly and downwardly to an anchorage 103 on draw bar portion 31. While the structure disclosed and the various struts, braces, etc., are theoretically rigid, actually they are somewhat flexible because of necessary weight restrictions, and it should be understood that additional braces may be supplied as necessary to stiffen the structure without departing from the principles of the invention which, insofar as the general structure is concerned, reside in the major framing elements and their peculiar relation to each other as hereinbefore set forth.

In the case of machines built according to the present invention in the larger sizes the extension of the auger trough to the right of the feeder house may be too great to be satisfactorily supported merely by the pivot bearings 63 and 64 in conjunction with links 76 and 81. Fig. 5 shows a modification of the construction which is adapted to give additional support to these longer harvesters or headers.

Thus a column, strut or brace 104 extends forwardly and upwardly from an axle 23a corresponding substantially to above mentioned axle 23 and supported on a wheel 16a, and is fortified against forward deflection by a brace 105 extending rearwardly to a suitable anchorage 106, Fig. 6, on the separator housing, conveniently on an upright 36a. Strut 104 has a pivot 107 at the upper end thereof, with which is engaged a pivot plate 108. The position of strut 104 is so chosen that pivot 107 is disposed substantially in alignment with pivot bearings 63a and 64a, Fig. 5, corresponding with above mentioned pivot bearings 63 and 64, Fig. 1, so as to provide a third pivot point spaced substantially from the feeder house 65a. Pivot plate 108 supports or locates the outer portion of an auger trough 66a in proper relation to the common center line of pivot 107 so as to prevent distortion and sagging.

For this purpose a strut 109 extends forwardly from pivot plate 108 to an anchorage 110 on trough 66a, and additional struts or braces 111 and 112 extend from pivot plate 108 to trough 66a at points respectively adjacent feeder house 65a and in the neighborhood of the outer end of trough 66a. A strut 113 also extends downwardly and forwardly from pivot plate 108 to an anchorage 114, Fig. 6, on trough 66a.

Brace 112 is preferably adjustable in length, in the present instance comprising two sections 115 and 116, section 116 being provided with a plurality of holes 117—117, one of which may be engaged by a bolt or the like 118 for fixing the effective length of the assembly. Adjustment of the length of member 112 will exert a twisting tendency upon auger trough 66a, thereby raising or lowering the outer end of the cutter bar and obtaining the desired alignment thereof with the ground.

Auger trough 66a preferably comprises two separable sections 119 and 120 united in any suitable manner, as by a flange joint generally designated as 121, so that section 120 may be removed if desired to make the machine narrower for transport. In this event the auger and reel are removed and carried on the machine, or in any other convenient manner.

Another point of novelty resides in the general arrangement of the driving mechanism for the machine. Substantially all threshing machines have a fan of some sort, in the present instance generally designated at 122, Fig. 1, and having a shaft 123 supported in the present instance on diagonal braces as 124 and 125, Fig. 4. As seen in Fig. 7, bearings of any suitable type as 126 and 127 support fan shaft 123 respectively from braces 124 and 125. In the present instance fan shaft 123 is made sufficiently strong to serve as a main power input or countershaft for all the drives on the machine.

Machines of this character are sold both as self-contained, self-operating units, and as units to be operated from a tractor through a power take-off shaft. These machines are customarily made up in advance of consumer demand and it is difficult to know what percentage will be sold as self contained and what percentage will be sold as power take-off machines. By virtue of the present invention, the machine may be manufactured complete as far as the power source, and either type of power may be readily added at the time of sale and without any material changes in the manufactured construction. This, as will appear, is accomplished either by connecting a suitable power take-off shaft to one end of fan shaft 123 or by mounting an engine adjacent the opposite end of shaft 123 and connecting a drive from the engine to the shaft, in accordance with the wishes of the purchaser.

Returning first to the power take-off arrangement, as seen in Fig. 1, a stub shaft 128 extends from the rear of tractor 19 and is suitably connected for driving by the tractor engine in well-known manner. Stub shaft 128 connects, through a universal joint shaft of well-known form generally designated as 129, with a power take-off shaft generally designated as 130, supported by a bearing 131 carried by a support 132 on draw bar 18. As more particularly shown in Fig. 8, shaft 130 is enclosed within a torque tube 133 fixed in any suitable manner as by bolts 134 with a cover plate or cap 135 of a housing 136, in which is journaled in suitable bearings as 136a and 136b, a stub shaft 137. Shaft 130 in the present instance is made hollow to reduce weight, and a steady-bearing 138 is provided intermediate the length of shaft 130. In the neighborhood of the inner end of shaft 130 a bearing 139 supports the shaft in desired relation to stub shaft 137. Interengaging gears 140 and 141, respectively on shafts 130 and 137 communicate the drive from shaft 130 to shaft 137. Housing 136 is suitably supported on draw bar 18, for example being rockingly held in suitable apertures in plates 142 and 143, Fig. 7, the tendency of gear 140 to cause rotation of housing 136 (Fig. 8) about shaft 137, being resisted by torque tube 133.

Above mentioned support 132 is preferably made adjustable in height, as appears in Fig. 9, comprising an upper section 144 and a lower section 145 connected as for example by bolts 146—146. Additional holes as 147 are provided for bolts 146 for changing the height of bearing 131 to suit various tractors with which the combine may be used or for other reasons. This adjustment is provided without other expedients than the rocking support of housing 136 in plates 142 and 143.

Stub shaft 137, Fig. 7, is united with above mentioned fan shaft 123 in the present instance by means of a coupling 148 clamped about the shafts by bolts or the like 149—149, keys 150—150 being interposed to assure positive driving relation between the shafts and coupling.

A sprocket 151 or the like fixed with shaft 123, in the present instance beyond or outside of bearing 126 drives, through a chain 152 (Fig. 1) and a sprocket 153, a shaft 154, Fig. 3, carrying a threshing cylinder 155.

Returning to Fig. 7, a sprocket 156 forming part of an overload release clutch of well-known construction, generally designated as 157, drives, through a chain 158 as more particularly shown in Fig. 4, a sprocket 159 on a shaft 160 which operates above mentioned feeding apparatus 69 as will appear. Chain 158 also drives a sprocket 161 which actuates an overload release clutch generally designated as 162, and a shaft 163 which actuates a beater 164, Fig. 3. Shaft 160 also has a sprocket 165 which actuates, through a chain 166, a sprocket 167 on a shaft 168 forming the axis of above mentioned auger 68 as will appear.

Chain 166 in the present instance passes over an idler or tightening sprocket 169 adjustably supported in a bracket or the like 170, and sprocket 169 has fixed therewith a sprocket 171 engaged by a chain 172 driving a sprocket 173 which actuates, through an overload release clutch generally designated as 174, a shaft 175 carrying above mentioned reel 70. Chain 172 is maintained in a suitable condition of tension by a tightener generally designated as 176 including a lever 177 pivoted at 178 to a portion of feeder housing 65 and urged rearwardly by a spring or the like 179. Lever 177 carries a sprocket 180 over which passes above mentioned chain 172. A sprocket 181 is journaled in fixed relation in the neighborhood of pivot 178 and beneath which above mentioned chain 172 is directed. It will thus be apparent that all of the drives in the machine are actuated from above mentioned fan shaft 123.

Certain other auxiliary drives originate in one or another of the above mentioned shafts, for example, shaft 163 of above mentioned beater 164 extends entirely through the machine and has a pulley 182, Fig. 1, driving through a belt 183 and a pulley 184, suitably journaled on separator housing 46, Fig. 1. Pulley 184 is in driving relation with a pulley 185 which drives, through a belt 186, a pulley 187, connected by a shaft 188 with a straw spreader 189, idlers 190 and 191 being supported on body portion 15 to provide for carrying belt 186 around the rear of body portion 15. Shaft 163 carries also a sprocket 192 driving, through a chain 193 and a sprocket 194, a shaft 195 actuating an unloading auger 196 more particularly shown in Fig. 3.

Other drives to auxiliary and supplementary mechanism originate from above mentioned overload release clutch 157, Fig. 4, but which it is unnecessary to show and describe further as they are of well-known construction and form no part of the present invention, for example, a sprocket 197 driven through above mentioned overload release clutch 162 actuates, through a chain 198, a sprocket 199 on a shaft 200 which actuates in well-known manner clean grain auger 201, Fig. 3, and a clean grain elevator generally designated as 202, Fig. 4.

Above mentioned sprocket 167 also constitutes a crank for a pitman generally designated as 203, which actuates above mentioned cutter bar 67 as shown more particularly in Figs. 10 and 11. Sprocket 167 has fixed therewith a pin 204 on which is suitably retained a bearing 205 which in the present instance is of the anti-friction self-aligning type. A housing 206 fits about bearing 205 and provides an opening 207 for the entrance of pin 204, the opening being of such a size as to allow limited misalignment of housing 206 relatively to pin 204. Housing 206 is fixed with and constitutes part of above mentioned pitman 203.

Pitman 203 as suggested comprises housing 206, a shaft or bar 208 and a clamp or socket portion 209, the bar and socket being of well-known construction so that it is unnecessary to describe them further.

Socket portion 209 engages a ball element 210, Fig. 12, fixed on a laterally extending arm 211 carried by a sleeve portion 212. Sleeve 212 in the present instance is journaled on a pin or the like 213 supported in a shelf-like element 214 carried by above mentioned housing 65 and a bracket 215, also carried by housing 65. Sleeve 212 also has a generally rearwardly extending arm 216 carrying a ball element 217 embraced by a clamping portion 218 connected with a bar 219 for actuating sickle 220, Fig. 11, bar 219 being united with sickle 220 in any preferred manner as by a clamp or connection 221. Sleeve 212 and its arms 211 and 216 accordingly constitute an offset bell crank which serves to transmit the motion of pitman 203 around the corner of housing 65 to sickle 220.

Sickle 220 forming no part of the present invention need not be further described.

Referring to Fig. 10, shaft 168 constitutes a journal for above mentioned auger 68. In the present instance, shaft 168 does not run entirely through auger 68 but is engaged in a sleeve 222 preferably of angular cross section, carried by spaced plates 223 and 224, sleeve 222 being welded or otherwise suitably fixed with plates 223 and 224 and the whole constituting a spool-like element inserted in the tubular core portion 225 of auger 68, shaft 168 having a portion 168a of a cross section to engage sleeve 222 in driving relation.

Owing to the relatively wide spacing of bearing elements 227 and 228, shaft 168 is very strongly held in desired position against the reactions of pitman 203, bearing 226 being very solidly held by brackets 229, 230, etc. Also, because of the cross section of portion 168a and sleeve 222, auger 68 may be readily disassembled from shaft 168 by a mere endwise movement, shaft 168 remaining in place in bearing member 226. In this way, a rigid connection is provided between shaft 168 and auger 68, core portion 225 being very rugged, and it becomes unnecessary to run shaft 168 through the length of auger 68. Shaft 168 is journaled in a bearing element 226 in the present instance constituting a sleeve-like member carrying anti-friction bearing units generally designated as 227 and 228. Bearing element 226 has upper and lower bracket members 229 and 230 clamped by bolts 231 and 232 against brackets 233 and 234 carried by above mentioned housing 65. Brackets 233 and 234 are spaced somewhat from brackets 229 and 230 and spacers, washers, or the like 235 and 236 are introduced in order to afford a solid structure for engagement by bolts 231 and 232. Vertical adjustment of auger 68 may be accomplished by shifting one or more of washers 235 on to bolt 232 to raise the auger, or shifting one or more of washers 236 on to bolt 231 in order to lower the auger. This adjustment is sometimes needed to compensate for different crops or conditions.

The outer end of auger 68 is preferably made similar. A spool-like element 237 carries a shaft 238 journaled in a bearing of suitable type 239 for supporting the outer end of the auger. As more particularly shown in Fig. 1, bearing 239 has a flange portion 240 fixed as by bolts 241—241 with a frame element 242 of harvester portion 20. As seen in Fig. 13, bolts 241 may be engaged in one or another of a plurality of holes 243—243 to obtain desired adjustments of bearing 239. In this manner a secure support for rotatable auger 68 is obtained and at the same time a solid and durable drive for sickle 220.

As seen in Figs. 1 and 14, auger 68 is provided within trough 20 with a stripper rail generally designated as 244. Stripper 244 in the present instance comprises an angle iron or the like 245 secured to auger trough 20 in the rear of auger 68 so as not to interfere with the access of material to the front and top of the auger. The rotation of auger 68 would naturally tend to move material beneath the auger and upwardly in back of the auger. Such upward movement is prevented by stripper 244 and material is forced to follow along lengthwise of the auger and into the feeder housing 65. Angle iron 245 has a strip 246 suitably secured thereto as by bolts 247 engaged in slotted holes or the like to provide for adjustment of strip 246 toward and from auger 68. Between the vertical adjustment provided in the auger, and the adjustment of strip 246, satisfactory relations are provided to suit the various conditions of crops harvested by the machine.

As seen in Fig. 3, auger 68 after entering feeder housing 65 has paddle-like portions 248 and 249 which tend to throw material away from auger 68 and impel it upwardly along an inclined deck 250 constituting the floor of feeder housing 65. Above mentioned feeding mechanism 69 takes the material and carries it upwardly the rest of the distance on deck 250.

Paddle portions 248 and 249 are assisted in their action by a baffle portion 250a, which, as more particularly seen in Fig. 3, is inwardly displaced from the front of feeder house 65 to form an inwardly tapered space in which paddle portions 248 and 249 can operate. Baffle 250a acts to gather any material moving along the front of auger 68 in the feeder house and, due to its taper, to force such material between paddle portions 248 and 249. Material is thus promptly cleared out of the feeder house, and not allowed to accumulate in front of the paddle.

Feeding mechanism 69 is of the undershot raddle rake type, the rake being generally in the form of spaced endless chains connected by cross slats. As seen in Figs. 3, 15 and 16, a lower pair of sprockets 251 and 252 are fixed on a shaft 253 journaled in appropriate bearings supported in feeder housing 65 as will appear. A pair of upper sprockets 254 and 255 are supported on above mentioned shaft 160. Chains 256 and 257 extend respectively about sprockets 251 and 254 and 252 and 255 and also about tightener sprockets 258 and 259, preferably journaled on a shaft 260. Chains 256 and 257 are connected at intervals by cross slats 261—261 which are of suitable type, in the present instance channel bars with their open sides facing the exterior of the chain.

It will be noted that cross slats 261 travel in close proximity to deck 250 so that material impelled part way up the deck by paddle portions 248 and 249 is caught between deck 250 and slats 261 and compacted and compressed to a certain extent into a pad or ribbon-like body which slides over the deck in such a manner as to be under the complete control of the slats and chains. At the upper end of deck 250 the ribbon of material passes directly to cylinder 155, there being no necessity for any beaters, feeders or the like between conveying means 69 and cylinder 155. It is impossible for cylinder 155 to draw in more than the desired amount of material, because of the firm grip of slats 261 on the compressed ribbon-like body of material being fed to the cylinder.

A concave of suitable type, generally designated as 262, is supported from members 49 and 51 in working relation to cylinder 155 and in the present instance comprises a plurality of transverse upwardly open channel bars 263—263 fixed in the present instance on a grating, generally designated at 264, so that threaded kernels may drop through in well-known manner. The space between grating 264 and deck 250 is substantially closed by a plate 265 which in the present instance is hinged at 266 to members 49 and 51 and retained upwardly beneath grating 264 by a detent of suitable or well-known form, generally designated as 267. In the event that a stone or other solid object is inadvertently introduced into the ribbon of material being fed to cylinder 155, it will normally be impelled against plate 265, the impact disengaging detent 267, so that plate 265 will be forced downwardly to the dotted position to allow the object to escape. Plate 265 is easily restored to working position whereupon operations can be resumed. Other means such for example as shear pins are contemplated for holding plate 265.

A closure strip 268 hinged at 269 to deck 250 rests upon plate 265 and prevents escape of material between deck 250 and plate 265 as housing 65 is swung about shaft 160 for raising or lowering cutter bar 67.

Strip 268 preferably, although not necessarily, is provided with a plurality of upstanding blades 270—270 and which are effective in cutting up any long and stringy material into short lengths so as to avoid any tendency toward wrapping of same about cylinder 155, it being understood that blades 270 may be omitted where such cutting action is not necessary, as more particularly shown in Fig. 18.

Above mentioned shaft 260 extends outwardly through slots as 271 in housing 65 and is adjustable by means of bolts or the like 272 carried in brackets 273, the bolts extending through shaft 260 and being threadedly engaged therewith so that adjustment of the bolts will cause movement of shaft 260 and sprockets 258 and 259 in a chain tightening direction. In the present instance slot 271 is closed by a plate 274 movable with shaft 260. It will be understood that the construction of this tightening device is duplicated on the opposite end of shaft 260.

Cylinder 155 is adjustable toward and from concave 262 by shifting of bearings 54 and 56. These adjustments being identical, only one will be described. Thus as seen in Fig. 16, support member 55 consists of an angle iron having an outwardly turned flange 275 against which is bolted bearing 56. An adjusting strip 276 is clamped on the opposite side of flange 275 from bearing 56 by bolts 277—277, the bolts traversing slotted openings 278 in flange 275. Bolts 277, however, are relatively closely fitted in strip 276. Strip 276 has openings 279—279 which are spaced from each other in increments slightly different from the spacing of other openings 280—280 in flange 275. A bolt 281 traverses registered openings in strip 276 and flange 275 and may be placed in any position where one of openings 279 registers with one of openings 280. Changing bolt 281 from one opening to another will require a very slight movement of strip 276 with a corresponding slight movement of bearing 56, bolts 277—277 being loosened during such adjustment. Tightening of all the bolts will lock bearing 56 positively in the new position.

Cylinder 155 is preferably, although not necessarily, of the rasp bar type, in the present instance comprising a pair of heads 282 and 283, Fig. 17, fixed on above mentioned shaft 154 in suitable or well-known manner as by collars 284 and 285. Heads 282 and 283 are joined at intervals by strips 286—286. Strips 286 may be made of any suitable type but in the present instance are formed as shallow channel bars opening toward the interior of the cylinder. They are attached as by rivets 287—287 to heads 282 and 283 and serve as supports for channel bars 288—288. Channel bars 288 constitute the major active elements of the cylinder and are placed with their open sides facing outwardly so as to present relatively sharp edges to the incoming material. In the present instance channel bars 288 are arranged to have a slight return bend substantially at the middle of their length. The angular disposition of bars 288 results in a wiping action of these bars on the material between themselves and concave bars 263 which is less abrupt than the effect would be if the bars were placed parallel to shaft 154, although it is to be understood that many of the advantages of the invention could be realized without placing the bars on the cylinder in this particular manner, it being understood that the invention is not to be taken as limited by anything in this description or in fact in any manner.

Above mentioned beater 164, Fig. 3, receives a large amount of the material flying off of cylinder 155 and prevents it being thrown too far to the rear in casing 15, the material being stopped by the beater and forced downwardly onto straw racks 289.

Straw racks 289 are of novel construction, comprising in the present instance, as shown in Fig. 19, side plates 290 and 291, connected by cross slats 292—292 in the present instance comprising sheet metal strips, the strips being perforated and receiving longitudinal elements formed of wires 293—293. Owing to the extreme thinness of the sheet metal strips and wire, a very efficient straw rack is provided in which the percentage of openings for the passage of grain is much greater than in prior known constructions.

Straw racks 289 are supported for reciprocating movement within separator housing 15 in well-known manner and above mentioned grain pan 57 is preferably, although not necessarily, supported in part and actuated by the same mechanism, generally designated as 294. Cleaning shoe 58 may be of any suitable type within the contemplation of the invention having sieves 295 and 296 and a return pan 297 leading to above mentioned grain auger 201. Above mentioned fan 122, as indicated, supplies a blast to sieves 295 and 296 and also to straw rack 289 in the manner common to this type of machine.

Straw rack 289 in the present instance comprises a pair of rack units 298 and 299 which in the present instance are supported on cranked portions of a shaft 300 driven by above mentioned pulley 184, Fig. 1, rotation of the shaft causing a combined oscillating and reciprocating movement of rack units 288 and 289 in well-known manner.

Shaft 300 as more particularly shown in Fig. 20, has a crank portion 301 and a pin 302 connected by a pitman of suitable type 303 with a pin 304 forming part of a bell crank generally designated as 305. Bell crank 305 is in the present instance fixed with a rock shaft 306 which passes through housing 15 and is journaled for rocking movement in suitable or well-known manner. Bell crank 305 also has a pin 307 fixed therewith for supporting above mentioned cleaning shoe 58, pin 307 extending within a sleeve element 308 fixed with a plate 309 to which shoe 58 is fastened. A bushing 310 of flexible elastic rubber or rubber-like material is interposed between pin 307 and sleeve 308 and serves as a non-metallic connecting means between bell crank 305 and shoe 58.

In operation, rotation of shaft 300 causes oscillating of bell crank 305 as will be understood and this in turn causes reciprocating movement of shoe 58, the slight change in angularity between pin 307 and sleeve 308 being absorbed by distortion to bushing 310 so that no frictional contact between working parts is present at this point. Furthermore, bushing 310 is yieldable to some extent in any direction and prevents or reduces in marked degree any hammering effect that might otherwise develop in the rapidly reciprocating mechanism.

Grain introduced to clear grain auger 201 as indicated, is transmitted by elevator 202, Fig. 4, to above mentioned grain bin 21. When it is desired to empty bin 21 this is done by above mentioned unloading auger 196 as indicated in Fig. 3. As more particularly shown in Fig. 21, auger 196 is supported by means of shaft 195 in a bearing 311 supported in grain bin 21 and a bearing 312 supported in a delivery tube or housing 313, extending laterally from grain bin 21. Auger 196 may be jointed at 314 so that the outer section may be removed along with tube section 313 to narrow the machine for transportation. Shaft 195 extends through and has journaled thereon above mentioned sprocket 194 and beyond the sprocket comprises a square or similar angular section 315. A collar 316 is slidably arranged on section 315 and has clutch teeth 317 engageable with corresponding teeth 318 on sprocket 194. Collar 316 may be shifted on portion 315 by means of a shipper 319 carried by a shifter rod 320 slidably supported in brackets 321 and 322 depending in the present instance from grain bin 21. A spring 323 compressed between above mentioned bracket 321 and an abutment 324 on the rod tends to retain collar 316 in disengaged position.

At the outer end of tubular section 313 a cover plate 325 is provided, pressed there-against by a spring 326 and which may be moved laterally away from tubular section 313 by a handle portion 327. With a wagon or other suitable receptacle beneath tubular portion 313, removal of cover 325 and engagement of clutch collar 316 with sprocket 194 will cause rotation of auger 196 and prompt emptying of grain bin 21.

The weight of grain in bin 21, resting on auger 196 would tend to cause unnecessary consumption of power in rotating the auger, and to obviate this a shield 196a is supported in bin 21 above auger 196. Grain readily finds its way to auger 196 at either side of shield 196a as readily apparent from Fig. 3, while the bulk of grain is not permitted to rest directly on the rotating auger.

In the event of these machines being used with tractors of limited power they are readily equipped with their own engines as above suggested. Referring to Fig. 6, a base in the present instance comprising a box-like element 327 is mounted on portions 29a and a cross member 328 or other convenient portions of base frame 24a and an engine generally designated as 329 of suitable type forming no part of the present invention is mounted on base member 327. In the present instance engine 329 has a carburetor intake 330, a cooling air intake 331, a fly wheel housing 332 and an exhaust outlet 333. Engine 329 also has a sprocket 334 connected by a chain 335 with a sprocket 336 fixed on a fan shaft 123a corresponding in substantially all respects to above mentioned fan shaft 123. As above described, motion imparted by engine 329 to fan shaft 123a will be transmitted to all the other working parts of the machine, it being understood that in such instance as when engine 329 is driving fan shaft 123a, the above described power take-off mechanism will be disconnected or omitted entirely from the machine.

It will thus be apparent that it is unnecessary in setting up one of these machines for either power take-off or separate engine drive to disturb any of the drives of the machine in any manner, and while it is contemplated that either one type of drive or the other will ordinarily be supplied, it is entirely within the invention to supply both engine and the power take-off on the same machine, and which may be used alternatively as conditions require.

The operation of the machine is thought to be clear from the above description, no further description thereof being necessary, except to say that the source of power input is connected to the fan shaft, and from which all other drives in the machine originate. The grain is cut by sickle 67, transmitted into feeder house 65 by auger 68, and fed in the form of a compressed ribbon beneath feeder 69 to cylinder 155. Feeder 69 prevents uncontrolled feeding and "slugging"

and effects feeding of the cylinder without the employment of auxiliary beaters or other expedients. In the event of long straw, stringy weeds or the like, the same are cut into short lengths by knives 270. Flying kernels are caught by beater 164, and the grain is extracted from the straw by straw racks 298 and 299. Chaff is removed in cleaning shoe 58 in well-known manner, a blast being supplied by fan 122. Clean grain is deposited in bin 21, and readily emptied therefrom by auger 196.

The above being a full and clear description of an illustrative embodiment of the invention, what is claimed as new and desired to be secured by Letters Patent of the United States is:

1. In a harvester-thresher the combination of a substantially rectangular, uniplanar horizontal base portion disposed transversely to the direction of progress of the harvester-thresher, ground engaging supports at the ends of said base portion in supporting relation thereto, a drawbar substantially coplanar with, rigidly fixed to, and substantially normal to said base, a plurality of spaced apart substantially vertical columns fixed on and extending upwardly from said base, a grain bin in engagement with and supported on the upper extremities of said columns, a threshing cylinder and cleaning fan disposed between said base portion and said grain bin and also between said spaced-apart columns, and supported at least in part from said columns, a generally forwardly and downwardly inclined feeder house and harvester part hinged to certain of said columns at a location above said base, means on said base pressing forwardly against said harvester part and reacting backwardly against said base to maintain said feeder house and harvester part against downward and rearward swinging, said harvester part tending to cause forward tilting of said base and upstanding columns, and a separator housing portion fixed to others of said columns and extending rearwardly therefrom in cantilever relation tending to cause rearward tilting of said base and upstanding columns, said separator housing and said feeder house and harvester part being so proportioned and positioned that the tendency of the one to cause rearward tilting, and the tendency of the other to cause forward tilting of said base and upstanding columns, substantially balance each other, any resultant tilting tendency caused by any difference in such tilting tendencies being sustained by the rigid connection of said drawbar to said base.

2. In a harvester-thresher the combination of a substantially rectangular, uniplanar horizontal base portion disposed transversely to the direction of progress of the harvester-thresher and having front and rear transverse members, ground engaging supports at the ends of said base portion in supporting relation thereto, a drawbar substantially coplanar with, rigidly fixed to, and substantially normal to said base at one end thereof, a plurality of spaced apart substantially vertical columns fixed on and extending upwardly from the front transverse member of said base, a plurality of spaced apart substantially vertical columns fixed on and extending upwardly from the rear transverse member of said base, a grain bin in engagement with and supported on the upper extremities of said columns, a threshing cylinder and cleaning fan disposed between said base portion and said grain bin and also between said spaced-apart columns, and supported at least in part from said columns, a generally forwardly and downwardly inclined feeder house and harvester part hinged to the front plurality of columns at a location above said base, means on said base pressing forwardly against said harvester part and reacting backwardly against said base to maintain said feeder house and harvester part against downward and rearward swinging, said harvester part tending to cause forward tilting of said base and upstanding columns, and a separator housing portion fixed to the rear plurality of columns and extending rearwardly therefrom in overhanging relation tending to cause rearward tilting of said base and upstanding columns, said separator housing and said feeder house and harvester part being so proportioned and positioned that the tendency of the one to cause rearward tilting, and the tendency of the other to cause forward tilting of said base and upstanding columns, substantially balance each other, any resultant tilting tendency caused by any difference in such tilting tendencies being sustained by the rigid connection of said drawbar to said base.

3. In a harvester-thresher the combination of a substantially rectangular, uniplanar horizontal base portion disposed transversely to the direction of progress of the harvester-thresher, ground engaging supports at the ends of said base portion in supporting relation thereto, a drawbar substantially coplanar with, rigidly fixed to, and substantially normal to said base, a plurality of spaced apart substantially vertical columns fixed on and extending upwardly from said base and constituting therewith a substantially vertical stress bearing structure, a grain bin in engagement with and supported on the upper extremity of said stress bearing structure, a threshing cylinder and cleaning fan disposed between said base portion and said grain bin and also between said spaced-apart columns, and supported from said stress bearing structure, a generally forwardly and downwardly inclined feeder house and harvester part hinged to said stress bearing structure at a location above said base, means on said stress bearing structure pressing forwardly against said harvester part and reacting backwardly against said stress bearing structure to maintain said feeder house and harvester part against downward and rearward swinging, said harvester part tending to cause forward tilting of said stress bearing structure, and a separator housing portion fixed to said stress bearing structure and extending rearwardly therefrom in cantilever relation tending to cause rearward tilting of said stress bearing structure, said separator housing and said feeder house and harvester part being so proportioned and positioned that the tendency of the one to cause rearward tilting, and the tendency of the other to cause forward tilting of said stress bearing structure, substantially balance each other, any tilting tendency caused by any difference being sustained by the rigid connection of said drawbar to said base.

NORMAN R. KRAUSE.
SHERMAN C. HETH.

References Cited in the file of this patent
UNITED STATES PATENTS

| Number | Name | Date |
|---|---|---|
| 2,147,267 | Pierson | Feb. 14, 1939 |
| 2,169,472 | Oehler et al. | Aug. 15, 1939 |